US012291444B2

(12) United States Patent
Christopher

(10) Patent No.: US 12,291,444 B2
(45) Date of Patent: May 6, 2025

(54) EQUESTRIAN CONTROL DEVICE AND METHODS OF USE

(71) Applicant: Erin Christopher, Atlanta, GA (US)

(72) Inventor: Erin Christopher, Atlanta, GA (US)

( * ) Notice: Subject to any disclaimer, the term of this patent is extended or adjusted under 35 U.S.C. 154(b) by 0 days.

(21) Appl. No.: 18/673,438

(22) Filed: May 24, 2024

(65) Prior Publication Data

US 2025/0066184 A1 Feb. 27, 2025

Related U.S. Application Data

(60) Provisional application No. 63/533,715, filed on Aug. 21, 2023.

(51) Int. Cl.
*B68B 1/04* (2006.01)

(52) U.S. Cl.
CPC .................................... *B68B 1/04* (2013.01)

(58) Field of Classification Search
CPC .... B68B 1/04; B68B 1/06; B68B 1/08; A44C 11/00; A44C 13/00; A44C 23/00
USPC .............. 54/6.1, 7, 15; D30/134–143; 63/38
See application file for complete search history.

(56) References Cited

U.S. PATENT DOCUMENTS

| | | | | |
|---|---|---|---|---|
| 319,439 A | | 6/1885 | Barbour | |
| 544,777 A | | 8/1895 | Spohr | |
| 720,689 A | | 2/1903 | Hall et al. | |
| 1,054,593 A | * | 2/1913 | Elton | B68B 1/06 54/7 |
| 1,368,704 A | | 2/1921 | De La Mota | |
| 2,463,279 A | | 3/1949 | Jones | |
| 2,623,340 A | * | 12/1952 | Rudolph | B68B 1/04 54/6.1 |
| 2,931,154 A | | 4/1960 | Sauter | |
| 2,940,238 A | | 6/1960 | Poole | |
| 4,798,043 A | * | 1/1989 | Wyse | B68B 1/06 54/6.1 |
| 5,231,818 A | | 8/1993 | Newman | |
| 6,490,848 B2 | | 12/2002 | Myler et al. | |
| 7,207,162 B2 | | 4/2007 | Deffner | |

(Continued)

OTHER PUBLICATIONS

Facebook page of Bar-O-aBIT LLC, a Western Bit Rental Service (Home page, Bar-O-aBIT post Apr. 30, 2021; photo Jul. 12, 2022 ; photo Mar. 18, 2023; Jul. 11, 2022) (Year: 2021).*

(Continued)

*Primary Examiner* — Morgan T Jordan
*Assistant Examiner* — Danielle A Clerkley
(74) *Attorney, Agent, or Firm* — Richard C. Piercy, Esq.; Grell & Watson Patent Attorneys LLC

(57) ABSTRACT

An equestrian control device and methods of use. The control device includes an improved curb strap device for installation into a bit of a bridle assembly. The device includes an assembly of a looped-strap pair located about an elongated member having installed thereon a plurality of serially attached elements. The straps can be secured to a shank-type bit installed in the mouth of the equine, which can further be secured to reins. In combination, specialized straps and serially attached elements combine to increase comfort of the equine and the rider's ability to control the equine. Additional biasing features of the strap assembly and strap-alternative assemblies are disclosed to supplement this comfort and control. A method of installing and using the device.

20 Claims, 6 Drawing Sheets

(56) References Cited

U.S. PATENT DOCUMENTS

| | | | | |
|---|---|---|---|---|
| 7,503,163 | B2 | 3/2009 | Deffner | |
| 2008/0276579 | A1 * | 11/2008 | Deffner | B68B 1/08 54/6.1 |
| 2009/0130954 | A1 * | 5/2009 | Maricevic | A41F 15/002 450/88 |
| 2012/0216492 | A1 | 8/2012 | Ehrmann | |

OTHER PUBLICATIONS

Bar-O-aBIT Facebook page (Year: 2021).*

* cited by examiner

EQUESTRIAN CONTROL DEVICE AND METHODS OF USE

CROSS REFERENCE TO RELATED APPLICATIONS

To the full extent permitted by law, the present U.S. Non-Provisional Patent Application hereby claims priority to and the full benefit of, U.S. Provisional Application No. 63/533,715, filed Aug. 21, 2023, entitled "Device for Controlling a Horse's Head", which is incorporated herein by reference in its entirety.

FIELD OF THE DISCLOSURE

The present disclosure generally relates to equestrian control devices, specifically a curb strap designed to be used in coordination with bridles and various related tack.

BACKGROUND OF THE DISCLOSURE

Generally, horse tack encompasses a wide array of equipment and accessories utilized in the handling, training, and riding of horses. From bridles and saddles to bits and stirrups, each piece of tack serves a distinct purpose in facilitating consistent and reliable communication between rider and horse, ensuring comfort and safety, and enabling precise control during various equestrian activities. Among these components, the bridle is critical for directing and guiding the horse's movements, making it an indispensable element in the toolkit of any professional equestrian or enthusiast, especially during certain performance and/or competitive horse riding.

Bridles specifically serve as essential equipment for controlling and communicating with horses during riding. Typically, a bridle encompasses an assembly of a variety of components either mounted and secured to the horse's head and/or extending into or somehow connected to the grasp of the rider, including, but not limited to, reins, a bit, a curb strap, a noseband, and a headstall. However, the specific selection of these components varies based on factors such as the horse's mouth sensitivity, training level, and the rider's experience.

The mechanism of control and communication between rider and horse, using the bridle, relies on the manipulation of reins, which then transmit pressure to different areas and/or parts of the horse's head through the interconnected system of the bit, the curb strap, the noseband, and the headstall. Within this system, the curb strap plays a crucial role serving to enhance the effectiveness of rein cues and aid in the rider's communication with the horse. Curb straps may be most commonly used with shank or curb bits. Shank or curb bits may be generally used on horses which are more advanced in their training, rather than on young horses. A shank bit is a leverage bit, meaning that when the rider applies 5 pounds of pressure on the reins, the horse will feel more than 5 pounds in its mouth. It may feel 10, 15, 20 or more pounds of pressure depending on the length of shank, shape of shank, and the corresponding underlying physics. Unlike a snaffle bit, where the reins attach at the level of the mouthpiece, the reins on a shank bit most commonly attach below the level of the mouthpiece. The shank bit affects four more areas of the horse's head than does the snaffle bit. Like the snaffle, the curb bit affects the corners of the mouth, tongue and bars but it additionally affects the roof of the mouth, the jaw, the chin groove, and the poll. Given this arrangement of such bridles and the corresponding precision needed to effectively control a horse using the reins of a shank bit, the curb strap can play an important role to acclimate and teach the horse to respond to various cues from the rider during the course of its training.

The curb strap additionally affects the action of the bit to further enhance its ability to improve rider control over the horse and provide a means of communication between the rider and the horse. In order to optimize this communications method, most recommend that the strap lie flat against the horse's chin groove and come into action when the shanks rotate back about 45 degrees. Loosening the chin strap may provide more of a pre-signal while tightening a curb strap may cause immediate curb pressure and increased pressure on the bars with applied rein contact. Therefore, a tighter curb strap is harsher and provides less finesse or less precise force application in communicating with the horse. As for constructions, it is generally accepted that leather curb straps are milder to horses than ones made of, for example a chain. The typical curb strap is generally about ½ inch wide with a thickness and length according to quality and/or strength of material and a horse's anatomical and/or behavioral needs. Accordingly, various considerations may be made in the choice of materials and construction of a curb strap, depending greatly on a rider's strength and riding style and a horse's training and demeanor.

Expanding upon the function of the curb strap within the context of the bridle tack, it can act as a supplementary means of control, particularly in bridles designed for leverage action. When rein pressure is applied, the bit exerts leverage on the horse's mouth through the cheekpieces, simultaneously activating the curb strap. This additional pressure on the horse's chin and (sub) mental/fascial tissue helps to refine the response to rein cues, providing clearer communication between horse and rider. Moreover, the curb strap assists in stabilizing the bit within the horse's mouth, preventing excessive movement or rotation that could lead to discomfort or confusion for the horse. By securing the bit in place, the curb strap ensures consistent and reliable contact between the rider's aids and the horse's responses, promoting harmony and understanding in their communication. Functioning synergistically with other components of the bridle tack, the curb strap can enhance the rider's control and communication with the horse. Its role in refining rein cues, stabilizing the bit, and facilitating clear communication underscores its importance as a fundamental element of bridling equipment.

Despite the importance of the curb strap in a shank bit bridle tack assembly, conventional curb strap designs and offerings may often fall short in meeting the diverse needs of horses and riders. Traditionally crafted from only leather and fasteners, these curb straps generally lack the flexibility and adaptability required to ensure optimal functionality. The rigid nature of leather curb straps can lead to discomfort for the horse, particularly if they are too stiff or lack sufficient flexibility to accommodate the horse's movements comfortably. Additionally, the standardized construction of leather curb straps may not adequately address individual variations in horse anatomy and sensitivity, resulting in a one-size-fits-all approach that fails to optimize performance. Additionally, such inflexibility may over-leverage the leverage generated by the physical conformation of the shank bit, leading to possible injury and other cruel treatment to the horse.

Moreover, the inherent limitations of leather curb straps, or at least fully-leather curb straps, can impact their responsiveness and effectiveness in communicating rein cues to the horse. In some cases, riders may find themselves needing to exert excessive force on the reins to elicit a desired response, leading to frustration and potential discomfort (or even injury) for both horse and rider. Conversely, leather curb straps that are too flexible or loose may lack the necessary rigidity to provide clear and consistent signals, compromising the precision of communication between horse and rider.

Furthermore, the static-length nature and/or length-rigidity of traditional curb strap designs may hinder the horse's ability to interpret and respond to subtle cues from the rider. Without the ability to dynamically adjust to the horse's movements and reactions, leather curb straps may impede the fluidity and responsiveness required for effective communication in various equestrian disciplines. This lack of reactivity can result in a disconnect between the rider's intentions and the horse's actions, undermining the harmony and partnership essential for successful performance.

So, despite being a critical piece of bridle tack with shank bit assemblies, the curb straps currently available to equestrians lack many of the flexibility, comfort, responsiveness, and adaptability features which may be important to an optimally functioning bridle assembly, underscoring the need for innovative solutions to enhance functionality of the overall bridle. Furthermore, by presenting only rigid, limited options to horse riders when it comes to curb strap assembly, many riders may simply not understand that alternative assemblies may adapt to unique behaviors and/or anatomies of various equines. By addressing these shortcomings and exploring alternative materials and designs, equestrian equipment manufacturers can elevate the performance and welfare of horses and riders alike, bringing with these advances improved efficiency, precision, and harmony in the art of equestrianism.

Therefore, a need exists for a device and method for equestrian control that takes into account various improvements to the curb strap, as it may relate to an improved bridle assembly. The instant disclosure may be designed to address at least certain aspects of the problems or needs discussed above by providing such a device and method of use.

SUMMARY OF THE DISCLOSURE

The present disclosure relates to an improved curb strap for use in horse bridle assemblies, offering enhanced control, comfort, and versatility for both horse and rider. The curb strap comprises several key components designed to optimize functionality and address the limitations of traditional leather curb straps.

In at least one aspect, the improved curb strap may feature opposing straps for operable combination with a bit or other attachment of the bridle assembly. Such straps may be of the type generally found in horse tack and bridles generally, such as leather or nylon, and may further feature buckles for convenient attachment and sizing adjustment. The straps may be structured and/or arranged using fasteners to secure an elongated member spanning the distance between the straps of the curb strap. The elongated member may be generally comprised of any strong high-tensile strength material, such as rope, braided wire, metal bars, elastic, natural rope, the like and/or combinations thereof. The elongated member may be attached using such fasteners to each opposing strap and may further feature beads disposed thereabout and/or along the elongated member. In use, other elements of the bridle and/or tack may first be secured to the horse according to manufacturer specifications and best practices in the art. To attach the improved curb strap to the bridle, the buckles of each strap may be disengaged, loosened, and detached, then looped through one or more components of the bridle assembly, including but not limited to the bit (e.g., shank bit) and/or a D-ring of the bridle.

In such aspects of such a curb strap configuration within a bridle assembly, features of the larger assembly may be important to the understanding of the improved curb strap of the disclosure. While. Shank or curb bits may be generally used on horses which are more advanced in their training, rather than on young horses. A shank bit is a leverage bit, meaning that when the rider applies 5 pounds of pressure on the reins, the horse will feel more than 5 pounds in its mouth. It may feel 10, 15, 20 or more pounds of pressure depending on the length of shank, shape of shank, and the corresponding underlying physics. Unlike a snaffle bit, where the reins attach at the level of the mouthpiece, the reins on a shank bit attach below the level of the mouthpiece. The shank bit affects four more areas of the horse's head than does the snaffle bit. Like the snaffle, the curb bit affects the corners of the mouth, tongue and bars but it additionally affects the roof of the mouth, the jaw, the chin groove, and the poll. Given this arrangement of such bridles and the corresponding precision needed to effectively control a horse using the reins of a shank bit, the curb strap can play an important role to acclimate and teach the horse to respond to various cues from the rider during the course of its training.

In some of the embodiments of the disclosure, the equestrian control device may improve rate control a rider may possess over a horse using the reins and other features of the bridle assembly in combination with various equestrian control devices of the disclosure. By both increasing the sensitivity a horse may have to certain physical communication and reducing the harm or injury done to the horse, the equestrian control devices of the disclosure may improve the ability and range of signals that may be extended from a simple pull on a rein. Such improvements may further improve control, especially for horses which may be stronger and/or more stubborn than others. By attaching a series of beads or other serial elements beneath its chin, further enhances to control of such horses may be obtained by ensuring smoother transitions between movements and by allowing users to more precisely apply forces to the assembly and the horse.

Further features may be important to the overall appearance and/or livery of the rider/horse combination. For instance, serial elements, such as beads, may be offered variety of colors, which may allow riders to mix and match with different colored tack or livery, enhancing aesthetic appeal and customization options. Such other features of the disclosed equestrian control device may further enhance this appeal, such as unique and/or valuable metals for buckles, as well as various patterns, colors, styles, and materials for various straps of the equestrian control device.

Then, it may be realized by those having ordinary skill in the art, upon a review of the below Detailed Description in combination with the Drawings, that such a equestrian control device as may be disclosed herein represents a significant advancement in equestrian and bridling technology, offering superior control, comfort, and aesthetic flexibility compared to traditional leather curb straps or other substitutes, such as chains. By increasing the control a rider has over his or her horse while simultaneously preventing unintended injury during such control, the disclosure seeks to both improve riding performance while ensuring humane and careful treatment of the horse.

The foregoing illustrative summary, as well as other exemplary objectives and/or advantages of the disclosure, and the manner in which the same are further explained within the following Detailed Description and its accompanying Drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-6, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples. As used herein, horse and equine may be used interchangeably, along with horse rider and equestrian, respectively. The word "tack" as it may be used herein is intended to cover any equipment or accessories equipped on horses and other equines in the course of their use as domesticated animals. Tack includes such items as saddles, stirrups, bridles, halters, reins, bits, and harnesses. Equipping a horse is often referred to as tacking up, and involves putting the tack equipment on the horse. A room to store such equipment, usually near or in a stable, is a tack room. The word "bridle" may be used interchangeable with horse bridle or horse's bridle and includes those tack elements which include the headstall that holds a bit that goes in the mouth of a horse, and the reins that are attached to the bit that provide additional control and communication through rein pressure, inclusive of a curb strap. The words "curb chain" and "curb strap" may be used interchangeably herein to mean a piece of horse tack that may be required for proper use on any type of curb bit. Curb chains/straps may generally comprise a flat linked chain or flat strap, respectively, that runs under the chin groove of the horse, between the bit shank's purchase arms. Curb straps may feature a buckle or hook attachment and or a "fly link" in the middle to hold a lip strap. Such chains and straps may be permanently or detachably connected to either side or both sides of the shank, though may preferably only attach permanently at only one side, enabling it to be detachably connected at the other during installation on a horse.

Figure 1:
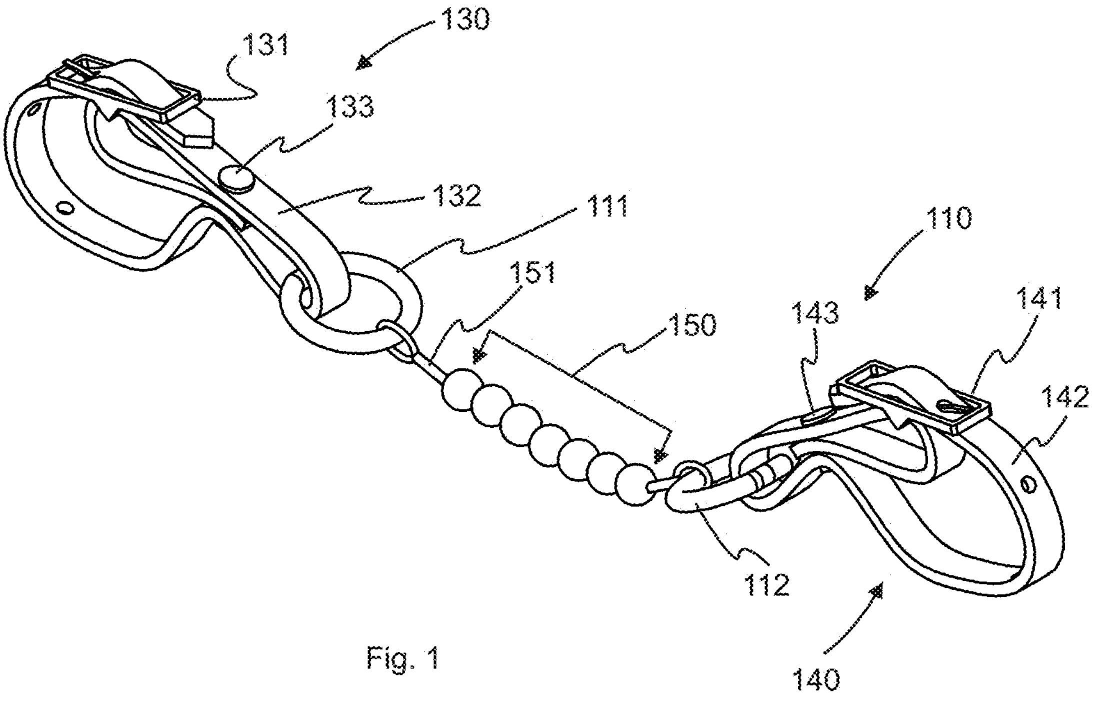
FIG. 1 is a perspective drawing of an exemplary embodiment of the curb strap of the disclosure.

Referring now first specifically to FIG. 1, therein is illustrated a perspective drawing of an exemplary embodiment of a curb strap of the disclosure, namely curb strap assembly 110. Curb strap assembly may generally feature first side adjustable strap 130 and second side adjustable strap 140 connected to flexible elongate member 151 having installed thereon serially attached elements 150 by first span connector 111 connected to first side adjustable strap 130 and second span connector 112 connected to second side adjustable strap 140. First side adjustable strap 130 and second side adjustable strap 140 may be identical and/or chiral (mirror images of each other), though differences may exist. In such identical and/or chiral assemblies, first side adjustable strap 130 and second side adjustable strap 140 may each feature certain components and/or subcomponents in order to produce each respective conformational shape to meet a need of a horse and a rider.

With respect to first side adjustable strap 130, these may include, as illustrated, first side buckle 131, first side buckle strap 132, and first side loop-forming connector 133. First side buckle 131 may be capable of opening, closing, and shortening a loop formed of first side adjustable strap 130, via certain features thereof first side adjustable strap 130 along first side buckle strap 132, such as holes, apertures, snaps, or other lengthening/shortening strap techniques which may be understood by those having ordinary skill in the art. First side buckle strap 132 may comprise leather, nylon, or other strong material that may be formed into a strap having a length. First side loop-forming connector 133 may connect through corresponding holes of first side buckle strap 132, thereby doubling the loop formed by first side buckle strap 132 and first side buckle 131. In some preferred embodiments of first side loop-forming connector 133, it may be formed of two components. By way of example and not limitation, such first side loop-forming connector 133 may include a sex bolt, a screw and post pair, a Chicago screw, and/or a barrel nut/bolt. Such conformation may enable operable combination between first span connector 111 and first side adjustable strap 130 at the loop formed thereof one side and another loop forming another operable connection means to shank top ring S1 (see FIG. 3), which may be opened and/or closed by first side buckle 131.

With respect to second side adjustable strap 140, certain components and/or subcomponents in order to produce each respective conformational shape to meet a need of a horse and a rider may include, as illustrated, second side buckle 141, second side buckle strap 142, and second side loop-forming connector 143. Second side buckle 141 may be capable of opening, closing, and shortening a loop formed of second side adjustable strap 140, via certain features thereof second side adjustable strap 140 along second side buckle strap 142, such as holes, apertures, snaps, or other lengthening/shortening strap techniques which may be understood by those having ordinary skill in the art. Second side buckle strap 142 may comprise leather, nylon, or other strong material that may be formed into a strap having a length. Second side loop-forming connector 143 may connect through corresponding holes of second side buckle strap 142, thereby doubling the loop formed by second side buckle strap 142 and second side buckle 141. In some preferred embodiments of second side loop-forming connector 143, it may be formed of two components. By way of example and not limitation, such second side loop-forming connector 143 may include a sex bolt, a screw and post pair, a Chicago screw, a barrel nut/bolt, the like and/or combinations thereof. Such conformation may enable operable combination between second span connector 112 and second side adjustable strap 140 at the loop formed thereof one side and another loop forming another operable connection means to shank top ring S1 (see FIG. 3), which may be opened and/or closed by second side buckle 141, for de/attachment thereto shank top ring S1. Importantly, first side adjustable strap 130 and second side adjustable strap 140 may be oppositely installed on each shank top ring S1, which may be installed on the horse at opposing sides at its mouth (see FIGS. 3-5).

Turning now to those features and mechanisms of curb strap assembly 110 which join first side adjustable strap 130 to second side adjustable strap 140, linking each opposing shank top ring S1 to potentially complete a bridle assembly, illustrated herein FIG. 1, flexible elongate member 151 may span a substantial portion of the distance between first side adjustable strap 130 and second side adjustable strap 140 and be connected to each respective strap via first span connector 111 and second span connector 112, respectively. About flexible elongate member 151 may be installed serially attached elements 150. Flexible elongate member 151 may be flexible along its length, but its length may not be fixed, flexible, or elastic and may substantially remain a fixed length, but may bend in shape to conform to certain anatomical features of the horse. Alternatively, flexible elongate member 151 may be rigid. Flexible elongate member 151 may comprise any material known by those having ordinary skill in the art to be capable of being formed into a length and provide the intended rigidity, flexibility, elasticity, or other desirable characteristics for facilitating accurate and precise rider/horse communication. Such materials may include, but are not limited to, rope, wire, elastic, string, chain, cord, cable, thread, twine, ribbon, strap, bungee cord, fishing line, ribbon, tether, webbing, shoelaces, vine, yarn, suture, the like and/or combinations thereof for bending/flexible material needs and bars, rods, beams, tubes, dowels, poles, rails, struts, braces, shafts, sticks, planks, profiles, columns, laths, billets, stanchions, girders, spars, trusses, the like and/or combinations thereof for more rigid needs. materials thereof may comprise metals, such as steel, aluminum, copper, brass, titanium, iron, nickel, bronze, the like and/or alloys thereof, synthetic polymers/fibers, including nylon, polypropylene, polyester, polyethylene, kevlar, fiberglass, carbon fiber, the like and/or combinations thereof, natural materials/fibers, such as, cotton, hemp, jute, flax, sisal, silk, wood, the like and/or combinations thereof, composite materials like fiber-reinforced polymers (FRP), reinforced concrete, plywood, laminates, particleboard, the like and/or combinations thereof, and rubber and elastomeric materials such as, natural rubber, silicone, neoprene, butyl rubber, polyurethane, the like and/or combinations thereof, or ceramics, which may include porcelain, stoneware, earthenware, terracotta, the like and/or combinations thereof. As illustrated, flexible elongate member 151 may be connected to each strap using any suitable means to join such flexible elongate member 151 to first side adjustable strap 130 and second side adjustable strap 140, including permanent and detachable means. These may include but are not limited to rings (as illustrated herein FIG. 1, first span connector 111 and second span connector 112), knots, stitches, rivets, braid(s), snap fasteners, gluing, loops, hook-and-loop fastening, quick-release attachment means, the like and/or combinations thereof. Various methods, apparatuses, assemblies, and devices may be used to construct flexible elongate member 151 and attach/fix thereto first side adjustable strap 130 and second side adjustable strap 140, which may include looping flexible elongate member 151 trough first span connector 111 and/or second span connector 112, crimping or potentially preferably double-crimping proximate an end, then looping at an opposite end through first span connector 111 and/or second span connector 112 after having installed serially attached elements 150 thereon flexible elongate member 151 and crimping and/or potentially preferably double-crimping proximate such end.

Turning now to the final components of curb strap assembly 110 as may be illustrated herein FIG. 1, illustrated thereabout flexible elongate member 151 may be serially attached elements 150, which may be recognized by those skilled in the art as it may relate to the embodiment illustrated herein FIG. 1 to be beads, though the description is not so limited. Such beaded embodiments of flexible elongate member 151 may include one or more bead types, consideration/choice of which may be highly relevant to the performance thereof curb strap assembly 110 as it may relate to a horse-riding experience and a particular equine's needs. For instance, if comfort for the horse is a primary consideration, serially attached elements 150 may be crafted from soft, non-abrasive materials such as silicone, rubber, or neoprene to ensure the comfort of the horse during prolonged wear. In this example, such materials may provide a gentle and cushioned contact against the horse's skin by serially attached elements 150, potentially reducing the risk of chafing or discomfort. Should precise communication be a primary consideration, serially attached elements 150 may be made from materials that offer distinct tactile feedback, such as metal, glass, or hard plastic. Such materials may produce a clearer and/or more noticeable sensation to the horse when engaged, facilitating precise cues and commands from the rider to the horse. If instead, durability and longevity of curb strap assembly 110 and/or serially attached elements 150 are primary considerations, serially attached elements 150 may be constructed from robust and resilient materials such as stainless steel, brass, or high-density polyethylene. Such materials may be more resistant to wear, corrosion, and environmental factors, ensuring that curb strap assembly 110 maintains its functionality and effectiveness over time, even under rigorous use. Other considerations like visibility and aesthetic appeal may be subject of certain embodiments of serially attached elements 150 of the disclosure and brightly colored or reflective beads may even be made from materials such as acrylic, glass, or thermoplastic polyurethane (TPU) can enhance the visibility of curb strap assembly 110, making it easier for the rider to monitor and adjust. Additionally, aesthetically pleasing beads can add a decorative touch to the bridle, enhancing its overall appearance. Finally, as it relates to both FIG. 1 and serially attached elements 150, it is contemplated herein that serially attached elements 150 may have electronic features installed therein, which may include biometric sensors to obtain biometric information from the horse and/or rider, pressure sensors, motion sensors, wireless communication module(s), lighting, vibration means/motors, electrical shock delivery mechanism(s), GPS tracking, the like and/or combinations thereof.

Figure 2:
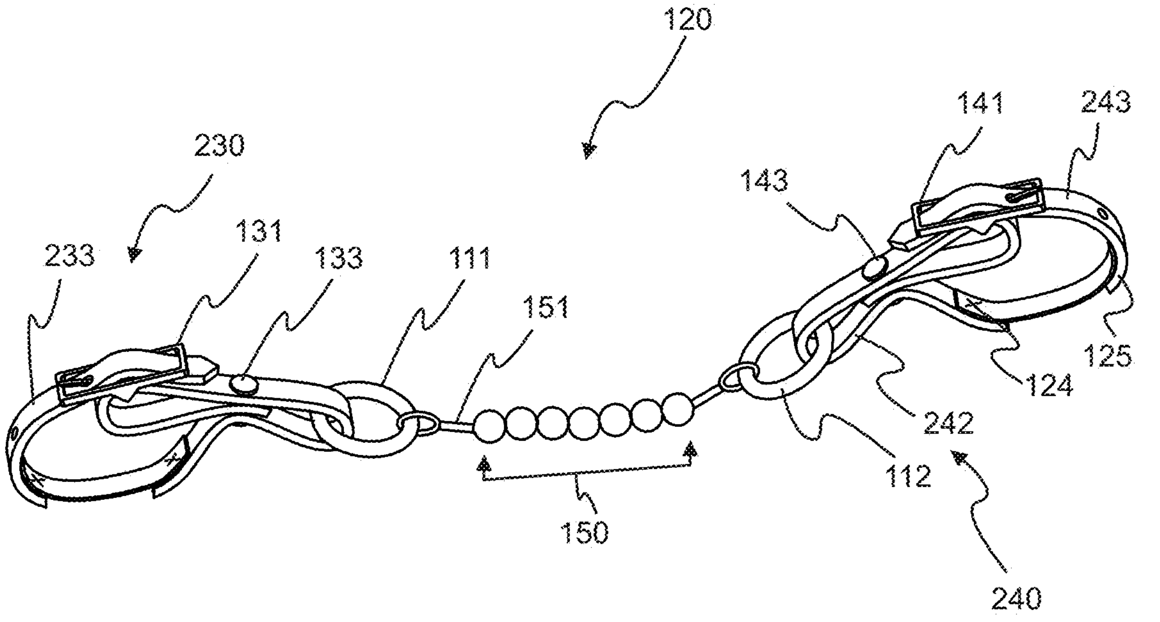
FIG. 2 is a perspective drawing of an alternate embodiment of the same.

Turning now to FIG. 2, illustrated therein is an alternate embodiment of the curb strap assembly, referred to as modified curb strap assembly 120. This assembly may maintain some or many similarities with the previous embodiment (curb strap assembly 110) but introduces modifications to enhance functionality and introduce additional biasing to the bridle arrangement. In modified curb strap assembly 120, the adjustable straps (first side adjustable strap 130 and second side adjustable strap 140) may be replaced by new components designed for improved adjustability and comfort. Importantly, each of curb strap assembly 110 and modified curb strap assembly 120 may commonly feature flexible elongate member 151 between the adjustable strap members, connected to each respective strap via first span connector 111 and second span connector 112. As it relates to the distinctions between these embodiments, on one side of modified curb strap assembly 120, first side stretching strap 230 may comprise first side buckle strap 232 and first side perforated strap 233. Between first side buckle strap 232 and first side perforated strap 233 may be installed first side flexible insert 121. Similarly, on the opposite side, second side stretching strap 240 may feature second side buckle strap 242 and second side perforated strap 243. Between second side buckle strap 242 and second side perforated strap 243, second side flexible insert 124 may be installed. Then, first side stretching strap 230 may be looped and buckled via a buckling arrangement of first side buckle 131 with first side female strap 233 and second side stretching strap 240 may also be looped and buckled via a buckling arrangement of second side buckle 141 and second side buckle 141, and each pinched at first side loop-forming connector 133 and second side loop-forming connector 143 to secure first span connector 111 to first side stretching strap 230 and second span connector 112 to second side stretching strap 240, which can then be joined together via the arrangement with flexible elongate member 151 having serially attached elements 150. Each of first side stretching strap 230 and second side stretching strap 240 may then be secured to a horse, other equine, and/or bridle assembly thereof according to means known by those having ordinary skill in the art, which may potentially preferably occur at shank top ring S1 such that rein R may be attached at shank bottom ring S2 (see FIGS. 3-5). Importantly, the assemblies, design, construction, and materials thereof of first side stretching strap 230 and second side stretching strap 240 may be similar and highly related, though distinct in choice of materials, given certain considerations by those having ordinary skill in the art. While leather and other materials which can be crafted to be bendable, but lengthily stiff and/or rigid (i.e., inelastic), may be suitable or even preferable for components such as first side buckle strap 232, first side female strap 233, second side buckle strap 242, and second side female strap 243, other components of each assembly may be preferably constructed of elastic or stretchable materials. These may include first side flexible insert 121 and second side flexible insert 124. Such suitable materials may possess the ability to stretch under applied force and return to their original shape once the force is removed. These materials may be commonly used in various applications requiring elasticity, such as clothing, footwear, seals, gaskets, adhesives, and sports equipment and may include, but are not limited to, elastic (the material), rubber, silicone, neoprene, latex, spandex, LYCRA®, elastane, polyurethane elastomers, thermoplastic elastomers (TPE), ethylene-vinyl acetate (EVA), natural rubber latex (NRL), butyl rubber, nitrile rubber, ethylene propylene diene monomer (EPDM), polybutadiene, polyisoprene, polyurethane foam (flexible foam), sorbothane, synthetic rubber blends, elastomeric fibers (e.g., elastane fibers, rubber threads), the like, and/or combinations thereof. As illustrated, other choices may be made to secure such material into such assembly at attachment areas 122, 123 for first side flexible insert 121 and attachment areas 125, 126 for second side flexible insert 124. Then, it may be observed certain benefits of modified curb strap assembly 120 having serially attached elements 150 and a biasing mechanism to increase force from the rider's reins in a more controllable and possibly more humane way. Such benefits may be universalized into a one-size-fits-all assembly that may provide all user's and horse's with similarly suitable control capabilities, may be offered in a variety of sizes, configurations, and biasing capabilities, or may be customized for a unique rider/horse pairing's needs. Additionally, other elements of curb strap assembly 110 or modified curb strap assembly 120 may introduce additional bias or restrict/constrain the bias of the system. For instance, flexible elongate member 151 may be constructed of materials which are not only flexible but also which are capable of stretching/biasing. Straps and other features may impart similar bias into the system or constrict it, and snaps may be added and/or installed to temporarily remove the biasing capability from first side flexible insert 121 and/or side flexible insert 124, for example, by installing removable snaps proximate attachment areas 122, 123 and/or attachment areas 125, 126 such that the corresponding flexible inserts 121, 124 may be looped and/or short circuited.

Figure 3:
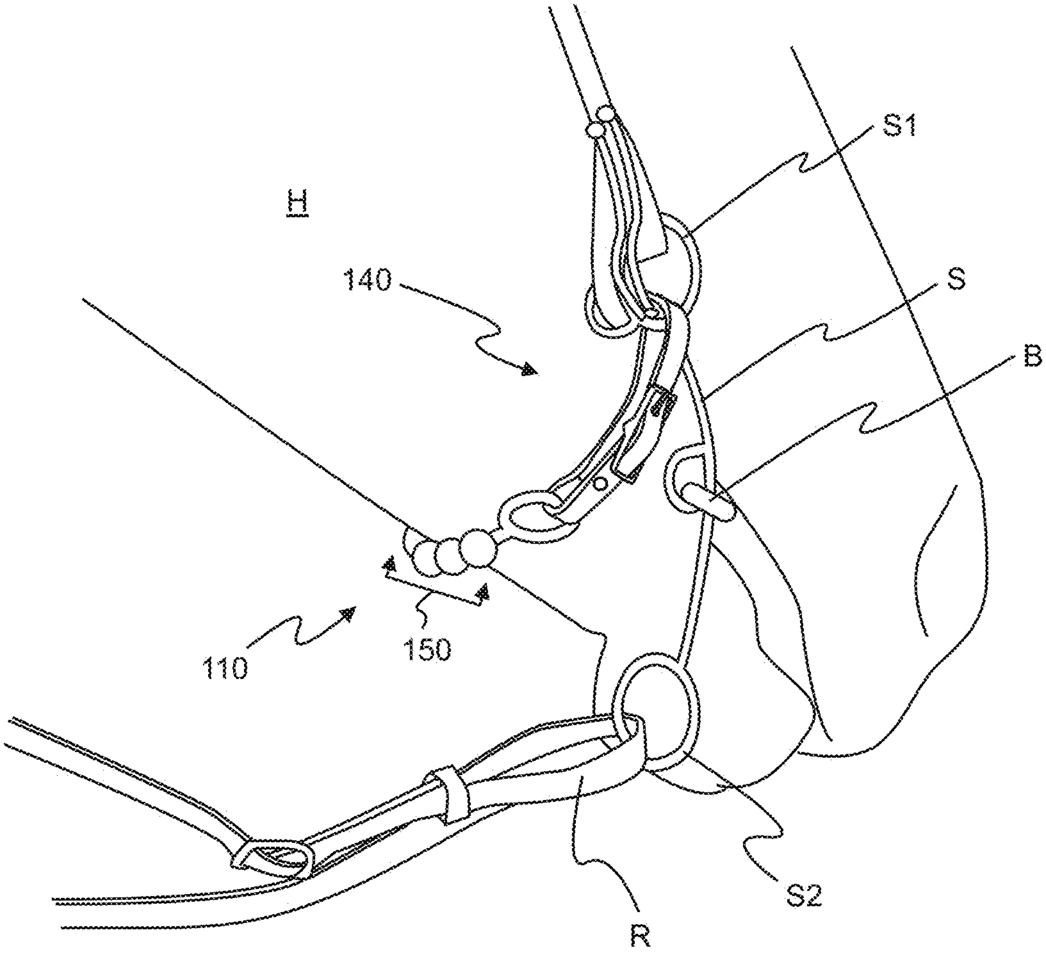
FIG. 3 is a perspective drawing of a horse's head bearing the bridal assembly of the disclosure.

Turning now to FIG. 3, illustrated therein illustrated is a perspective drawing of a horse's head bearing a bridal assembly of the disclosure. From the angle of the drawing herein FIG. 3 and its combination with a bridle assembly, certain features of equestrian control device may be better observed and recognized by those having ordinary skill in the art. Additionally, certain features of the bridle assembly which may be relevant to the performance of the disclosed equestrian control device, but which may not form a part of the specific equestrian control device as may be herein described. Those features may include bit B, shank S (which may include shank top ring S1, shank bottom ring S2 and a bit connection for operable combination with bit B), various bridle straps and components of assemblies thereof, and rein R. With regard to those elements, various features may relate or be important to the decision to use or not use a equestrian control device of the disclosure as well as various considerations for the construction of an equestrian control device may be made with this regard. Specifically, an equestrian control device of the disclosure and even curb straps generally may be avoided for bridle assemblies which do not feature, for example, a shank-type bit. A bit shank or alternatively named shank bit may be understood as a horse bit featuring a side piece or cheekpiece of a curb bit. The bit shank may enable leverage to be added to the pressure of the rider's hands and/or reins on the bit. Shanks may usually be made of metal, may be straight or curved, and may be decorated in some equestrian disciplines. To install the bit, the headstall and curb chain or curb strap of the bridle may be attached to the top of the shank at shank top ring S1, and the reins are attached at the bottom at shank bottom ring S2. Shanked curb bits may be generally used in western riding for what may be all adult horses, but may be also seen in English riding disciplines, however, may be featured primarily as part of a double bridle used by advanced dressage riders, and on the hybrid pelham bit that includes a ring for a second rein attached at the bit mouthpiece. Such alternative configurations may benefit from the described equestrian control device, as may other configurations and/or assemblies known by those persons having ordinary skill in the art. Importantly, direct pressure snaffle bits as well as other bit configurations may possess no shanks, and instead have a single bit ring. Such configurations may not be preferable and/or compatible with use of the equestrian control device of the disclosure, and users may desire to take care to avoid such potential misconfiguration to avoid causing pain or injury to the animal. Bits that do have shanks extending from the mouthpiece can assist to generate additional leverage by placing pressure on the poll via the crownpiece of the bridle, to the chin groove via the curb chain/strap, and, particularly with a "loose jaw" shank, may also touch the sides of the mouth and jaw.

Turning now to the features of the disclosed equestrian control device which may be visible herein FIG. 3, herein illustrated is curb strap assembly 110 in combination with the horse and bridle assembly. Then, it should be observed that curb strap assembly 110 may feature various components as described and illustrated in greater detail in FIG. 1, or alternatively as it may relate to modified curb strap assembly 120 and those components as described and illustrated with respect to FIG. 2. Given that curb strap assembly 110 and modified curb strap assembly 120 may be similarly constructed in their combination with other components of an exemplary bridle assembly, such of these described assemblies may be interchangeably used and/or substituted. In essence, such combination may occur via looping first side buckle strap 132 around and through shank top ring S1 on one side of a horse's mouth, buckling using first side buckle 131, then placing flexible elongate member 151 beneath/behind the horses chin and looping second side buckle strap 142 through and around shank top ring S1 of the other side of the horse's mouth and buckling using second side buckle 141, thereby securing it to the bridle assembly. As may be understood by those having ordinary skill in the art, such first side buckle strap 132 and second side buckle strap 142 may be adjusted along its length via a series of perforations and/or apertures known by those having ordinary skill in the art. Additionally, other constricting buckles/fasteners might be used to achieve such looping and tightening/adjustment. Then, it may be observed that serially attached elements 150 may be secured underneath the chin of the horse in an arrangement that may better influence a rider's ability to communicate to the horse via pulling on the reins, causing shank top ring S1 to move forward and upward, and then causing each of serially attached elements 150 to apply pressure beneath the horse's chin in a manner other than ligature, which may otherwise cause significant discomfort to the animal. Such displacement and pressure upwardly has been found to occur in a more controllable way given that the forces generated by such rein movement may be focused on each of serially attached elements 150 to convey one of a massage or more displaced pressures, rather than one which more similarly resembles or conveys a strangulation/garroting that may be achieved with flexible elongate member 151 only or various known substitutes, such as chains, not having serially attached elements 150. Additionally, those having ordinary skill in the art may recognize placement of serially attached elements 150 along flexible elongate member 151 may cause flexible elongate member 151 to not constrict against harder anatomical features of the horse, such as a jaw bone, in favor of application of pressure to softer, more forgiving anatomical features, such as the horse's submental space thereof its jaw bone. Additionally importantly, given that pressures may be applied to a horse's submental/fascial spaces, other care may be taken to avoid injury, such as selection of material and size for serially attached elements 150, which may be larger and/or of varying sizes along flexible elongate member 151, and may further be very hard (e.g., metal, stone, gems) or comparatively soft (e.g., cork, silicone, rubber). Such considerations may both further augment the versatility of equestrian control device and improve its performance during use.

Figure 4:
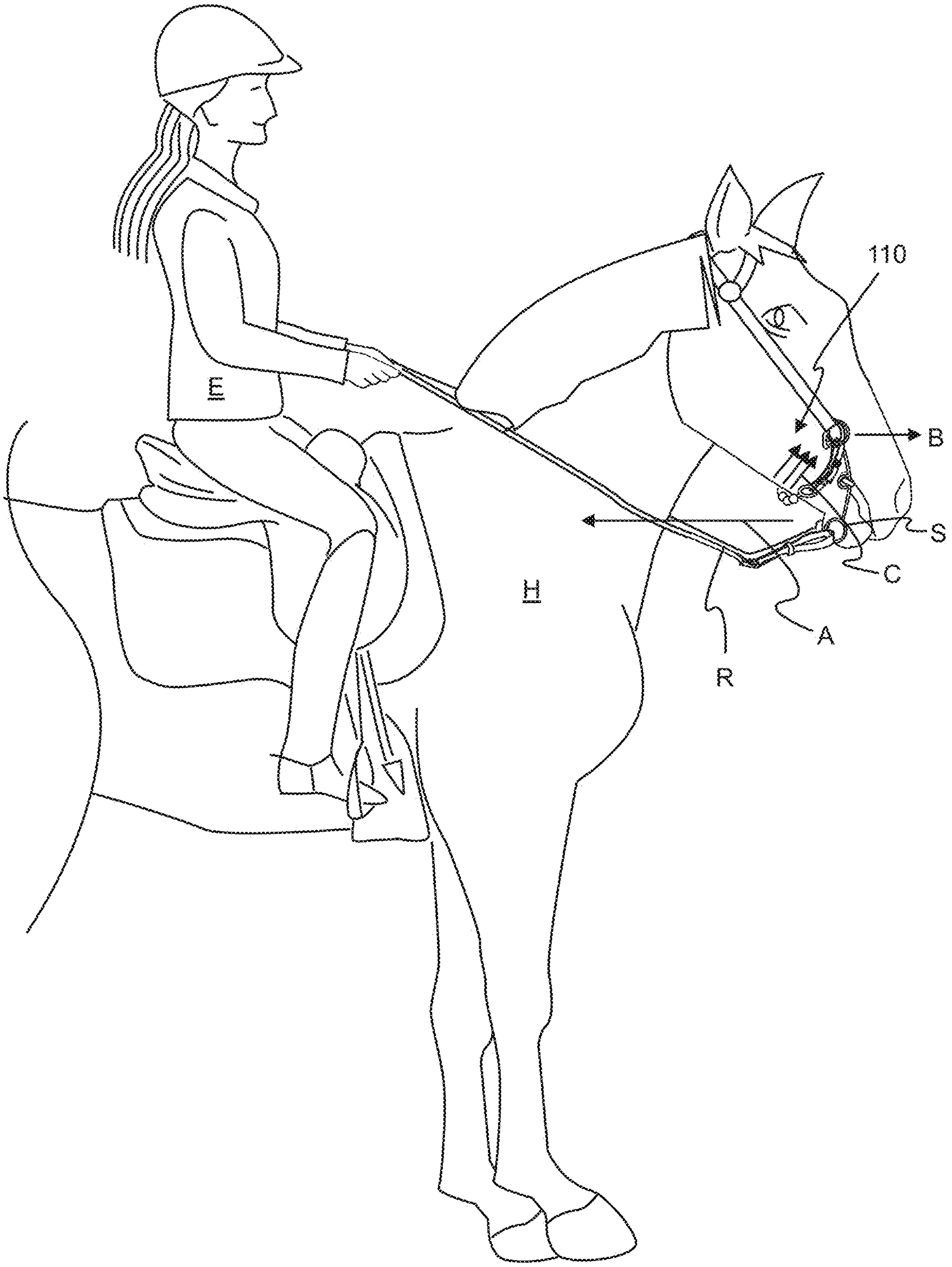
FIG. 4 is an elevation drawing of a horse and rider, the horse bearing the bridal assembly of the disclosure.

Turning now to FIG. 4, illustrated therein is an elevation drawing of a horse H and equestrian E, horse H bearing a bridal assembly of the disclosure, including curb strap assembly 110, such that forces A, B, and C of the bridle assembly can be more easily viewed. Then, with respect to a review of such forces, those having ordinary skill in the art may additionally appreciate certain features of equestrian control device with respect to other features of an exemplary bridle assembly in relation to the control of a horse, or other animal. Beginning at force A, which is illustrated as a pulling force by rein R, which may be caused by equestrian E pulling upon them, preferably backwardly and/or upwardly. Given the construction of an exemplary shank bit, such upward and/or backward forces upon rein R according to force A may cause the shank connected to the bit to pivot about the bit, causing force B, which may be a forward force on the upper portion of shank top ring S1. Such forces may appear at each side of the horse, or may alternatively come from one rein or the other, depending on intent of equestrian E and his or her communicative relationship with horse H. In scenarios where each rein R is pulled in the direction of force A at shank bottom ring S2 causing force B at shank top ring S1, forces C may be caused by each shank top ring S1 moving forward, restricting the spaces between the equestrian control device of the disclosure and the horse's mouth's underside/fascial space. Given that serially attached elements 150 may occupy such space between and flexible elongate member 151, these forces may operate in a serial manner rather than causing uniform or constricting pressure on this sensitive area. Such pressures caused by forces C may be uniform or non-uniform, depending on construction/materials of serially attached elements 150, the overall construction of equestrian control device of the disclosure, its bridle assembly, and tightness/looseness thereof.

Figure 5:
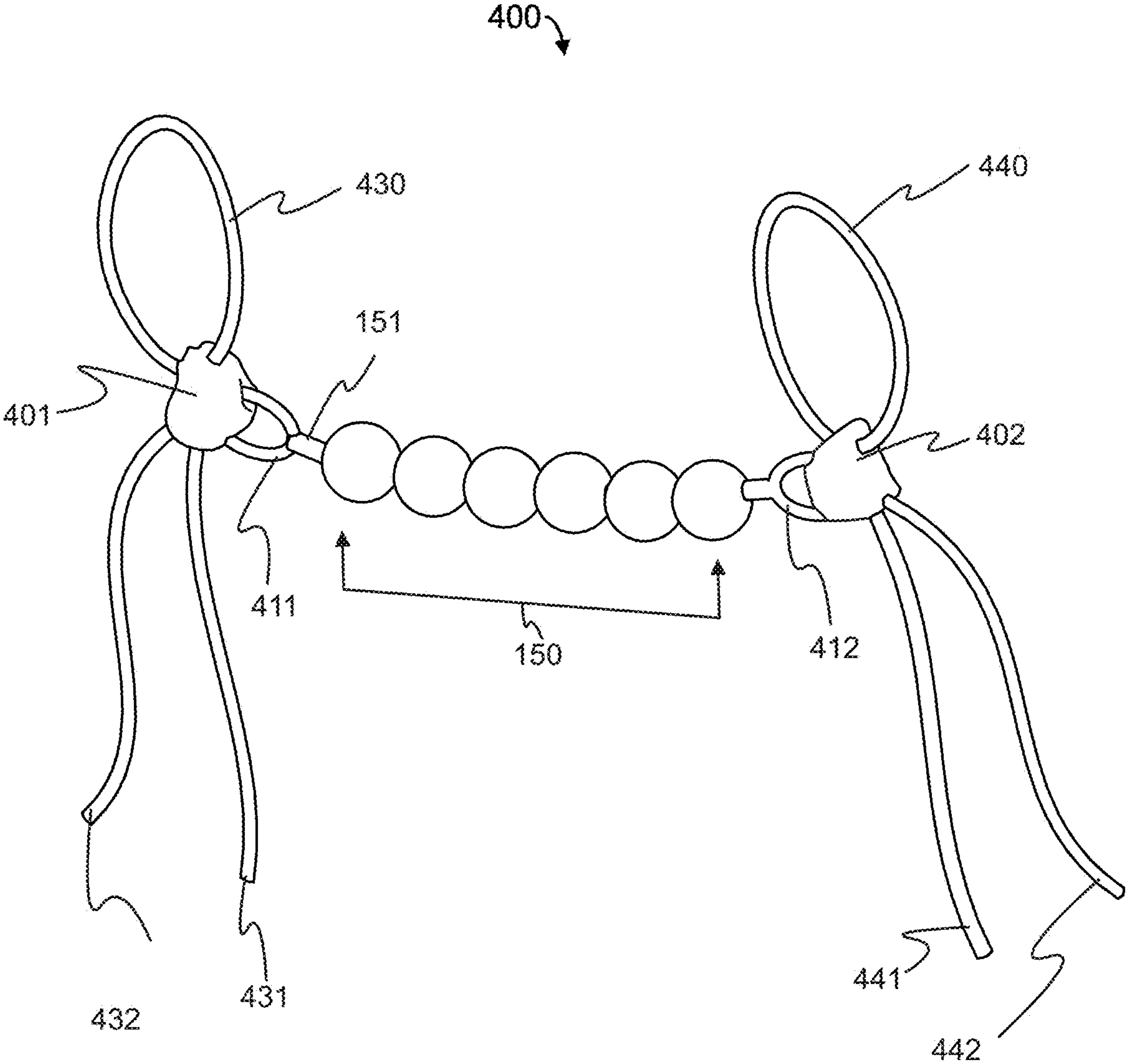
FIG. 5 is a perspective drawing of yet another alternate embodiment of the curb strap of the disclosure.

Turning now to FIG. 5, illustrated therein is alternate curb strap 400, which may offer certain minimalistic benefits, rather than traditional and/or aesthetic features, while preserving certain utilitarian features of, e.g., curb strap assembly 110 or modified curb strap assembly 120. Namely, curb strap assembly 110, modified curb strap assembly 120, and alternate curb strap 400 may each feature flexible elongate member 151 having installed thereon serially attached elements 150. Additionally, alternate first span connector 411 and alternate second span connector 412 may be identical and/or analogous to first span connector 111 and second span connector 112, respectively. Turning to distinct, though potentially analogous features of alternate curb strap 400 in comparison to either of curb strap assembly 110 or modified curb strap assembly 120, several components or a single elongated member may replace either of first side adjustable strap 130 and second side adjustable strap 140 or first side stretching strap 230 and second side stretching strap 240. Then, it may be observed by those having ordinary skill in the art that first side knot 401 may connect to flexible elongate member 151 via alternate first span connector 411. Extending from first side knot 401 may be first side loop 430 for combination with shank top ring S1 (see FIGS. 3-4). First side knot 401 may be tightened by pulling upon first side excess elongated member ends 431, 432, or in other known knot arrangements, first side loop 430 may be extended/contracted using certain cinch knots, which may enable a user to better adjust the entire length of alternate curb strap 400. Alternate curb strap 400 may additionally feature opposite first side knot 401, second side knot 402. Second side knot 402 may be identical or different from first side knot 401, as may be needed by users and their desired configuration. For instance, a very tight secure knot may be made at one side where another side may feature one which may be easily untied in order to achieve a quick release and installation of alternate curb strap 400. Then, second side loop 440 may extend from second side knot 402 to form the connection with shank top ring S1 (see FIGS. 3-4) and second side excess elongated member ends 441, 442 may extend therefrom to allow such manipulation and configuration of second side knot 402. Many suitable materials may form the various parts of alternate curb strap 400, including but not limited to natural fibers such as cotton, hemp, jute, manila, coir, sisal, and/or flax, synthetic fibers such as nylon, polypropylene, polyester, polyethylene, polyolefin, aramid (e.g., KEVLAR®), and acrylic, metallic materials such as steel, stainless steel, or weaves thereof and/or combinations thereof, such as paracord. Additionally, while a knot is illustrated to join each side to flexible elongate member 151, the disclosure is not so limited and may include loop(s) and toggle(s), hitch(es), splice(s), lashing(s), whipping(s), clamp (s), fastener(s), clip(s), binder clip(s), zip tie(s), VELCRO®, buckle(s), magnet(s), adhesive, twist tie(s), snap(s), snap hook(s), carabiner(s), grommet(s), rivet(s), button(s), sewing, staple(s), clamp(s), pin(s), safety pin(s), magnet(s), tuck(s), slot(s), hook and loop fastener(s), the like and/or combinations thereof. As may be observed by those having ordinary skill in the art, such substitutions may occur at one side or both.

Figure 6:
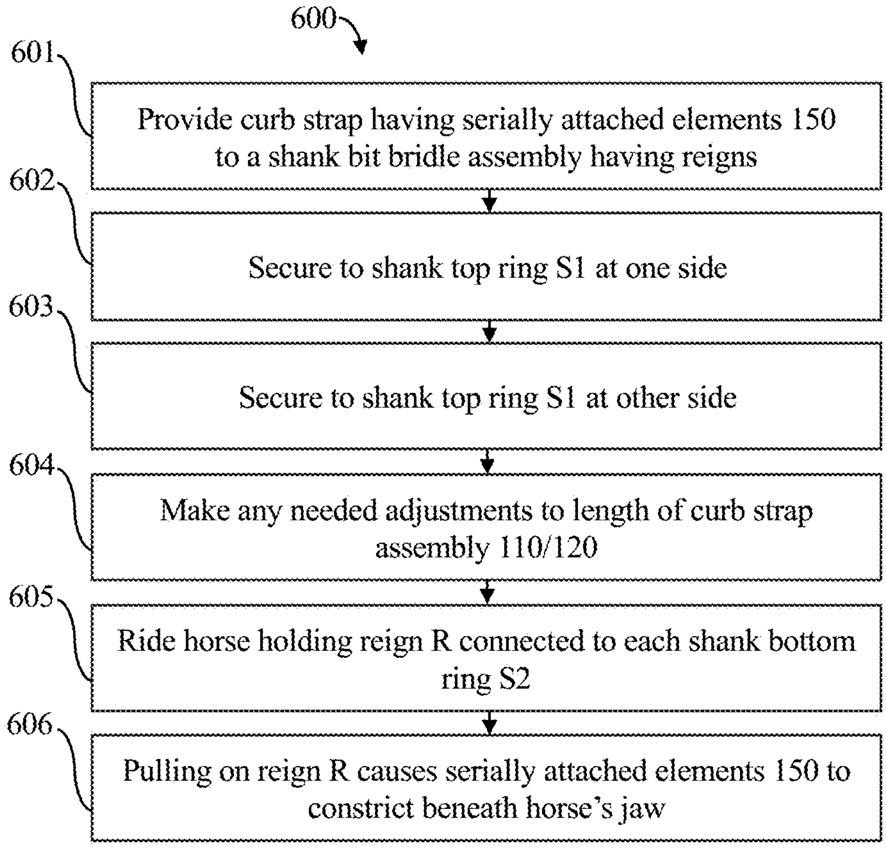
FIG. 6 is a flow chart of the method of the disclosure.

Turning now to FIG. 6, illustrated therein is a flow chart of exemplary method 600 of the disclosure. Beginning at 601, the method begins by providing a equestrian control device according to the disclosure (i.e., curb strap assembly 110 or modified curb strap assembly 120) having serially attached elements 150 held to each strap assembly by flexible elongate member 151. As described above, such elements may be designed to be attached sequentially to a shank S, which may be a shank bit bridle curb strap assembly, which may further include reins for controlling the horse's movements. Then, at step 602, the curb strap assembly may then be affixed to the shank bit bridle assembly, ensuring that it is properly aligned with rein R on each side of the bit (i.e., not tangled with or tied to the reins) for effective control of the horse. At step 603 and at one side of the shank bit bridle assembly, the curb strap may be securely fastened to the top ring S1. Step 604 may simply be repeating step 603 at the other side's shank bit bridle assembly, again taking care to secure the curb strap to the top ring S1 without tangling/tying and also, ensuring a balanced and symmetrical attachment. Optionally, at step 605 and prior to use, necessary adjustments to the length of the curb strap assembly can be made, ensuring a comfortable fit for the horse while maintaining proper functionality of the bridle assembly. Upon completing steps 601-5, step 606 may occur once the curb strap assembly is properly secured and adjusted, and equestrian E may mount horse H and hold reins R, which are connected to each shank bottom ring S2 of the bridle assembly as described above. Finally, having installed the equestrian control device of the disclosure and mounting the horse, step 607 may occur when the rider begins pulling upon reins R, generating tension upon the shank bottom rings S2, and causing serially attached elements 150 of either curb strap assembly 110 or modified curb strap assembly 120 to constrict beneath the horse's jaw. This action provides a controlled response from the horse, facilitating effective communication between rider and animal. Then, in various alternate embodiments of the disclosed method, the curb strap assembly may be attached to the shank bit bridle assembly starting from the right side instead of the left, maintaining flexibility in assembly. Additionally, adjustments to the length of the curb strap assembly may be facilitated through a quick-release mechanism, providing expedited customization for different horse sizes or rider preferences. Furthermore, in other embodiments of the disclosed equestrian control device and bridle assemblies, the reins may additionally be attached to the shank bottom rings S2 using a quick-release mechanism, allowing for swift detachment in emergency situations.

The illustrations described herein are intended to provide a general understanding of the structure of various embodiments. The illustrations are not intended to serve as a complete description of all of the elements and features of the apparatus, product, method of use, and/or system that utilizes the structures and/or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

As contemplated herein, according to the various embodiments of the disclosure herein, curb strap assembly 110 and/or modified curb strap assembly 120 of the disclosure may be manufactured to various sizes and shapes to accommodate a variety of animal shapes, anatomical features, and sizes. While the disclosure may be specifically addressed to uses with equines, namely horses or horse H, the disclosure is not so limited. Devices of the disclosure may be adapted to other animals as may be known to those having ordinary skill in the art, which may be further understood to include by way of example and not limitation, ponies, donkeys, mules, dogs, pigs, cows, other livestock, other animals, pets, the like and/or combinations thereof. To this end, it is further contemplated that the equestrian control device of the disclosure may be custom manufactured based upon measurements, photographs, stencils and/or other potential processes and methods for forming templates, thereby customizing the shape and fit to an individual animal or animal type. Similarly, a single-strap version of the disclosure may be provided having multiple adjustable parts or substitute/variation parts provided within a device or kit, thereby enabling a universal device for such various sized and/or anatomically distinct animals. Furthermore, the equestrian control device and apparatuses of the disclosure may include various accessory parts and/or attachments to further improve the utility thereof as may be understood by those having ordinary skill in the art.

As may be relevant to the disclosure as herein described, such additional embodiments of the disclosure may be realized herein and appreciated by those having ordinary skill in the art. The curb strap of the disclosure may be comprised of the specific materials as herein described, or substitute materials may be used as may be known to those having ordinary skill in the art. Specific features may be added and/or substituted, including the addition of elastic material as herein described and various specific adjustments may be available as are herein described and/or understood by those having ordinary skill in the art. While various leathers, metals, and other materials may be specifically described herein as suitable materials for the strap device of the disclosure, other materials may be substituted including but not limited to other leathers, other treated hides, synthetic leather substitutes, leather composites, various metals, alloys thereof, elastics, rubbers, woods, wood-fiber composites and/or laminates, paper, fabrics, non-woven fabrics, plastics, vinyls, other synthetic materials, other natural materials, composite materials, the like, and/or combinations thereof. Various adaptations to the connective means/mechanisms may additionally be substituted to accommodate such various material substitutions as may be understood by those having ordinary skill in the art. The various features and/or benefits of the strap device of the disclosure may be improved, augmented, modified, or otherwise change via such substitutions and trade-offs may exist for such substitutions.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. A curb strap comprising:

a pair of elongated members, each of said pair of elongated members comprising a first end, a second end, a first connection proximate said first end and said second end, and a second connection therebetween said first end and said second end, said second connection forming a first loop and a second loop of each of said pair of elongated members;

a connector pair, each of said connector pair installed at said second loop of each pair of elongated members;

an elongate flexible member having a first end and a second end, said elongate flexible member is connected to a first of said connector pair at said first end and a second of said connector pair proximate said second end; and a series of serially attached elements, each of said series of serially attached elements having an aperture, said series of serially attached elements are threaded thereon said elongate flexible member via said aperture between said first end and said second end of said flexible elongate member;

wherein the curb strap is configured to operably combine with a horse's bridle at a shank bit at each of said first loop of each of said pair of elongated members.

2. The curb strap of claim 1, wherein said pair of elongated members are leather straps.

3. The curb strap of claim 2, wherein said first connection is a buckle.

4. The curb strap of claim 3, wherein said second connection is a mating fastener.

5. The curb strap of claim 4, wherein said connector pair is a metal ring.

6. The curb strap of claim 1, wherein said elongate flexible member is a metal wire.

7. The curb strap of claim 6, wherein said series of serially attached elements are a plurality of beads.

8. The curb strap of claim 7, wherein said plurality of beads are silicone.

9. The curb strap of claim 7, wherein said elongate flexible member is an at least one flexible member selected from a group of flexible members, the group consisting of a chain, a cord, a paracord, a rope, and an elastic band and said plurality of beads comprise an at least one material selected from a group of materials, the group consisting of glass, plastic, polymers, resin, acrylic, rubber, wood, ceramic, metal, stone, silicone, and cork.

10. The curb strap of claim 9, wherein each of said connector pair is an at least one connector selected from a group of connectors, the group consisting of an O-ring, an S-hook, a D-ring, a clasp, an eyelet pair, a ball/chain connector, and a carabiner.

11. A method for controlling a speed of a horse, the method comprising:

providing a curb strap comprising:

a pair of elongated members, each of said pair of elongated members comprising a first end, a second end, a first connection proximate said first end and said second end, and a second connection therebetween said first end and said second end, said second connection forming a first loop and a second loop of each of said pair of elongated members;

a connector pair, each of said connector pair installed at said second loop of each pair of elongated members;

an elongate flexible member having a first end and a second end, said elongate flexible member is connected to a first of said connector pair at said first end and a second of said connector pair proximate said second end; and a series of serially attached elements having an aperture, each of said series of serially attached elements having an aperture, said series of serially attached elements are threaded thereon said elongate flexible member via said aperture between said first end and said second end of said flexible elongate member;

securing said curb strap on a bridle of the horse at a shank bit of said bridle at said first loop of each of said pair of elongated members;

securing a rein to said bridle at said shank bit; and applying a plurality of pressures at said shank bit via said reins, thereby controlling the speed of the horse.

12. The method of claim 11, wherein said pair of elongated members are leather straps.

13. The method of claim 12, wherein said first connection is a buckle.

14. The method of claim 13, wherein said second connection is a mating fastener.

15. The method of claim 14, wherein said connector pair is a metal ring.

16. The method of claim 11, wherein said elongate flexible member is a metal wire.

17. The method of claim 16, wherein said series of serially attached elements are a plurality of beads.

18. The method of claim 17, wherein said plurality of beads are silicone.

19. The method of claim 17, wherein said elongate flexible member is an at least one flexible member selected from a group of flexible members, the group consisting of a chain, a cord, a paracord, a rope, and an elastic band, and said plurality of beads comprise an at least one material selected from a group of materials, the group consisting of glass, plastic, polymers, resin, acrylic, rubber, wood, ceramic, metal, stone, silicone, and cork.

20. The method of claim 19, wherein each of said connector pair is an at least one connector selected from a group of connectors, the group consisting of an O-ring, an S-hook, a D-ring, a clasp, an eyelet pair, a ball/chain connector, and a carabiner.

* * * * *